(12) United States Patent
Hardy et al.

(10) Patent No.: US 6,337,029 B1
(45) Date of Patent: Jan. 8, 2002

(54) METHOD AND COMPOSITION FOR ETCHING GLASS CERAMIC AND PORCELAIN SURFACES

(75) Inventors: Richard D. Hardy, Westlake; Juan E. Jarufe, North Olmsted, both of OH (US)

(73) Assignee: Xim Products, North Olmstead, OH (US)

(*) Notice: Subject to any disclaimer, the term of this patent is extended or adjusted under 35 U.S.C. 154(b) by 0 days.

(21) Appl. No.: 09/235,122

(22) Filed: Jan. 21, 1999

(51) Int. Cl.[7] .................................................. B44C 1/22
(52) U.S. Cl. .................... 216/31; 427/266; 427/386; 252/79.4; 216/31; 216/96; 216/108; 216/109
(58) Field of Search ................................ 427/257, 266, 427/386, 387, 407.1; 252/79.1–79.4; 216/28, 31, 96–98, 108, 109

(56) References Cited

U.S. PATENT DOCUMENTS

| | | | |
|---|---|---|---|
| 273,588 A | 3/1883 | Nienstadt ...................... 216/31 |
| 276,893 A | 5/1883 | Schulz-Berge ................ 216/31 |
| 382,218 A | 5/1888 | Nienstadt .................. 222/179.5 |
| 736,994 A | 8/1903 | Meth ............................ 216/31 |
| 1,470,772 A | 10/1923 | Simon ........................ 252/79.3 |
| 1,471,466 A | 10/1923 | Hageman et al. ........... 252/79.1 |
| 2,067,925 A | 1/1937 | Clayton-Kennedy ....... 252/79.3 |
| 3,374,130 A | 3/1968 | Junge et al. ................... 216/97 |
| 3,481,879 A | 12/1969 | Salomone ................... 510/240 |
| 3,630,931 A | 12/1971 | Salomone ................... 510/240 |
| 4,376,673 A | 3/1983 | Cheung ........................ 216/96 |
| 4,650,718 A | * 3/1987 | Simpson et al. ............. 428/413 |
| 4,748,054 A | * 5/1988 | Wurr ........................... 427/259 |
| 4,921,626 A | 5/1990 | Rhodenbaugh ............. 252/79.4 |
| 4,960,511 A | * 10/1990 | Doble et al. ................ 210/96.1 |
| 5,281,350 A | 1/1994 | Gimm et al. ................ 252/79.2 |
| 5,423,910 A | 6/1995 | Schiller ........................ 106/36 |
| 5,614,444 A | * 3/1997 | Farkas et al. ................ 438/693 |
| 5,902,411 A | * 5/1999 | Williams et al. ................ 134/3 |
| 6,033,522 A | * 3/2000 | Iwata et al. .................. 156/345 |

OTHER PUBLICATIONS

5 Pages, Atotech, Atotech Technical Information, Safe Handling of Frosting and Etching solutions, Oct. 28, 1979.

1 page Abstract, "Anisotropy of Etching Rate for Quartz in Ammonium Bifluoride", 1979 IEEE International Frequency Control Symposium.

3 pages, Etchall Pricing and Product Descriptions, B & B Products, Inc., due unknown.

2 pages, Armour Etch Glass Etching Cream Pricing and Product Descriptions, date unknown.

* cited by examiner

Primary Examiner—Felisa Hiteshew
(74) Attorney, Agent, or Firm—Watts, Hoffman, Fisher & Heinke Co. LPA

(57) ABSTRACT

A composition comprising bifluoride salts in a somewhat viscous form for roughening glass, ceramic and porcelain surfaces in preparation for refinishing includes: a. bifluoride salts in an amount ranging from 10.0 to 85.0 parts by weight; b. thickener in an amount ranging from 0.1 to 5.0 parts by weight; c. organic solvent in an amount ranging from 2.0 to 20.0 parts by weight; and d. water in an amount ranging from 7.0 to 75.0 parts by weight. A coating of the composition is applied to a substrate, such as those having low surface tensions and to which paint adhesion is difficult. The coating is left in contact with the substrate for a period of time effective to roughen the substrate. The coating is then removed and discarded or alternatively, collected and reused. The substrate after treatment will have a roughened surface from which improved paint adhesion results.

20 Claims, No Drawings

METHOD AND COMPOSITION FOR ETCHING GLASS CERAMIC AND PORCELAIN SURFACES

TECHNICAL FIELD

The present invention relates generally to compositions and methods for chemically etching glass, ceramic and porcelain surfaces.

BACKGROUND OF THE INVENTION

The ability to paint glass, ceramic and porcelain surfaces can offer significant cost savings compared to replacing the substrates. Most air-dry, ambient cured coatings and paints do not bond well to ceramic surfaces without some kind of surface treatment and preparation to improve adhesion. Roughening or increasing the surface area has been found to improve adhesion and can be accomplished by any number of methods including mechanical abrasion.

Mechanical abrasion or sanding is a common method in use for preparing ceramic surfaces for refinishing. However, the labor and time required to prepare large surfaces for painting make this method cost prohibitive, especially when ceramic tile in an entire building requires refinishing.

SUMMARY OF THE INVENTION

The invention relates to a composition for roughening glass, ceramic and porcelain surfaces that is economical, easily applied, safe to use and can be used repeatedly in preparation for refinishing. This invention is also more advantageous than using free hydrofluoric acid because it can be used on large surface areas such as exterior porcelainized steel building panels as well as in enclosed areas with poor ventilation such as on tile and porcelain in bathrooms and kitchens for tubs, sinks and showers. The inventive composition can be applied by those methods known to those skilled in the art. Methods of application include, but are not limited to, application by trowel, brush, spray, or roller.

In general, the composition comprises:
  a. bifluoride salts in an amount ranging from 10.0 to 85.0 parts by weight;
  b. thickener in an amount ranging from 0.1 to 5.0 parts by weight.
  c. organic solvent in an amount ranging from 2.0 to 20.0 parts by weight; and
  d. water in an amount ranging from 7.0 to 75.0 parts by weight.

A preservative may be optionally added, the amount of preservative ranging from 0.05 to 0.75 parts by weight.

A surfactant may be optionally added, the amount of surfactant ranging from 0.1 to 2.0 parts by weight.

A toner may be optionally added, the amount of toner ranging from 0.01 to 1.0 parts by weight.

In particular, the invention is directed to a composition having a pH of at least 5.0. The composition has a viscosity in the range of from about 80 to about 100 Krebs Units at 25° C. and has a cream-like consistency. The composition includes the following:
  a. bifluoride salts in an amount ranging from 10.0 to 85.0 parts by weight based upon the total weight of the composition, preferred bifluoride salts being selected from the group consisting of sodium bifluoride and ammonium bifluoride;
  b. thickener in an amount ranging from 0.1 to 5.0 parts by weight based upon the total weight of the composition, preferred thickeners include polysaccharides, hectorite clays and polyurethanes;
  c. organic solvent in an amount ranging from 2.0 to 20.0 parts by weight based upon the total weight of the composition, preferred solvents being propylene glycol and dipropylene glycol; and
  d. water in an amount ranging from 7.0 to 75.0 parts by weight based upon the total weight of the composition.

The sum of the weights of the composition preferably totals 100 parts by weight. Of course, other compounds (such as preservative) may be added or omitted from a calculated formulation that has amounts of compounds that total 100 parts by weight, in which case the relative amounts of each of the compounds would be adjusted accordingly to total 100 parts by weight, as would be apparent to one skilled in the art in view of this disclosure.

In a preferred embodiment, a method of preparing glass, ceramic or porcelain surfaces for refinishing large surface areas comprises selecting at least one of the aforementioned substrates and applying a coating having the inventive composition. The surface of the substrate does not need be previously treated so as to be free from surface buildup of grime, soap scum and waxes. The coating preferably has a pH of at least 5.0. The composition has a viscosity preferably in the range from about 80 to about 100 Krebs units at 25° C. and has a cream-like consistency. The coating may be applied by techniques known to those skilled in the art, but is preferably applied by brushing, skim coating or spraying. The inventive coating is left in contact with the substrate for a period of time effective to roughen the surface, preferably for 4 to 5 minutes. The coating is then removed and discarded or more preferably, collected and reused. The inventive compositions are reusable and effective for as many as ten applications. The substrate after treatment will have a roughened surface characterized by improved adhesion of a second coating such as, paints.

The inventive composition is advantageous in that it can be applied to large surface areas easily and rapidly using conventional methods known to those skilled in the art. Buildings that are being rehabbed can have large surface areas that require refinishing in excess of one million square feet. Previous methods of refinishing large surfaces such as the type described include sandblasting or mechanical abrasion. Sandblasting or mechanical abrasion is very time consuming and inefficient. Besides the exorbitant costs of purchasing and maintaining the sandblasting or mechanical abrasion equipment, the equipment used is bulky and difficult to maneuver. Application of a reusable composition for preparing large surfaces for refinishing, such as in buildings undergoing rehabilitation, is believed to be novel and would be extremely efficient and cost effective. The viscous composition is quickly and easily applied to the large surface area for a short duration to roughen the surface and is then removed. The surface is roughened uniformly and without any of the characteristic sand marks observed with mechanical abrasion techniques. Using a composition having a cream-like consistency minimizes any splattering hazards associated with the application. The inventive composition is specially formulated to adhere exceptionally well to vertical surfaces with no run back. Furthermore, the inventive composition can be safely applied in confined areas with poor ventilation.

Other objects and a fuller understanding of the invention will be had from the following description of preferred embodiments.

DETAILED DESCRIPTION OF PREFERRED EMBODIMENTS

The present invention is directed to a method of using a composition comprising bifluoride salts in a somewhat viscous form for roughening glass, porcelain and/or ceramic surfaces in preparation for refinishing. The invention permits large surface areas to be refinished relatively quickly and economically compared to alternative methods, such as, mechanical abrasion or sanding methods.

The present invention is a composition of bifluoride salts blended and dispersed into a composition having a creamlike consistency for easy application to large surface areas using conventional means such as spraying, brushing, or troweling. This invention uses current paint and coating technology well known in the art to build-in aspects such as brushability, reduced splatter or splashing during application, controlled evaporation of solvents, shelf life stability and improved surface wetting on low surface tension substrates such as glass, glazed ceramics and porcelain. This invention does not include the addition of hydrofluoric acid or other acids to lower the pH of the composition. The pH of the present invention using bifluoride salts are of at least 5. A pH of at least 5 is only mildly acidic and as such is safer to use and handle than hydrofluoric acid.

Krebs type viscometers are widely used to measure the viscosity of paints and is well known to those skilled in the art. The viscosity of the present invention is measured in Krebs units and is preferably from about 80 to about 100 Krebs units at 25° C.

The composition of the present invention comprises bifluoride salts in an amount ranging from 10.0 to 85.0 parts by weight and even more preferably ranging from about 45.0 to 60.0 parts by weight, water in an amount ranging from 7.0 to 75.0 parts by weight, an organic solvent in an amount ranging from 2.0 to 20.0 parts by weight, and a thickener in an amount ranging from 0.1 to 5.0 parts by weight.

The sum of the weights of the composition preferably totals 100 parts by weight. Of course, other compounds (such as preservatives) may be added or omitted from a calculated formulation of the composition that has amounts of compounds that total 100 parts by weight, in which case the relative amounts of each of the compounds would be adjusted accordingly to total 100 parts by weight, as would be apparent to one skilled in the art in view of this disclosure.

The bifluoride salts useful for this invention are preferably ammonium bifluoride and sodium bifluoride. The bifluoride salts are the active ingredient for reacting with the substrates. A proposed reaction pathway, not intended to be limiting, is by contact of the bifluoride salts with a substrate containing silicates in the presence of water. Other reactions with other substrates will be apparent to those skilled in the art in view of this disclosure. Generally, glass, porcelain or ceramic substrates contain a mixture of silicates. The reaction using sodium bifluoride and silicon dioxide as an example, is presented in the following equations:

$$NaHF_2 \leftrightarrows Na^+ + BF_2^-$$

$$HF_2^- \leftrightarrows HF + F^-$$

$$6HF + SiO_2 \leftrightarrows H_2SiF_6 + 2H_2O$$

An equilibrium is established between the reactants and products, such that, as hydrogen fluoride is consumed in reacting with the silicon dioxide, more hydrogen fluoride is produced due to the equilibria present. The pH of the present invention using bifluoride salts are at least 5. A pH of 5 or greater is only mildly acidic and as such is safer to use and handle than hydrofluoric acid.

The bifluoride salts offer the following advantages:
a. reaction with the substrate to roughen the surface;
b. adjustment of the composition to a pH of at least 5;
c. allowing application in closely confined areas with poor ventilation; and
d. a composition that is less toxic and easier to handle than hydrofluoric acid.

The thickeners used are stable in compositions having a pH of about 5 or greater. The thickeners that are preferably used are polysaccharides, hectorite clays and polyurethanes. Examples of suitable commercial polysaccharides include those sold under the trade names KELZAN HP, KELZAN ASX, KELZAN S manufactured by Kelco and OPTIGEL CX manufactured by Sud-Chemie. Examples of suitable commercial hectorite clays include those supplied by Rheox under the trade names BENTONE LT and BENTONE HC. Examples of suitable commercial polyurethanes include those sold under the trade names RHEOLATE 205 and RHEOLATE 208, manufactured by Rheox. Other thickening agents for use in the present invention would be apparent to one skilled in the art in view of this disclosure.

The thickeners offer the following advantages:
a. reducing splashing or splattering during application;
b. improving adhesion to vertical surfaces;
c. reducing evaporation of solvents;
d. improving brushability; and
e. controlling viscosity and consistency The organic solvents that are suitable for use in the invention include slow evaporating ester alcohols, glycols or glycol ethers that are miscible with water. The preferred solvents include dipropylene glycol methyl ether acetate, propylene glycol n-propyl ether, di- or monoethylene glycol n-butyl ether, dipropylene glycol methyl ether, propylene glycol phenyl ether, propylene glycol and 2,2,4-trimethyl-1,3-pentanediol monoisobutyrate. Examples of suitable commercial organic solvents are those supplied by Dow Chemicals under the trade name DOWANOL, those supplied by Arco Chemicals under the trade name ARCOSOLV and those supplied by Eastman Chemical under the trade name TEXANOL. Other solvents for use in the present invention would be apparent to one skilled in the art in view of this disclosure.

The organic solvents provide the following functions:
a. slowing the evaporation rate;
b. improving surface wetting;
c. dissolving surface buildup of grime, soap scum and waxes; and
d. maintaining consistency of the composition for easy removal and reuse.

The coating composition may also contain chemical additives. These additives can include, but are not limited to, surfactants and wetting agents, preservatives and toners. Examples of surfactants and wetting agents are modified polyethers, modified alkylperoxy ethanols and ethoxylated acetylenic compounds such as those supplied by Air Products under the trade names SURFYNAL 485W, SURFYNAL 104DPM and those supplied by Union Carbide under the trade names TRITON X405 and TRITON CF10. Examples of suitable preservatives include 1(3-chloroallyl)-3,5,7-triaza-1-azoniaadamantane chloride available by Dow Chemicals under the trade name DOWICIL 75, and 2-(hydroxymethyl)amino-2-methylpropanol under the trade name TROYSAN 192. Examples of suitable toners include those supplied by Elementis Specialties under the trade names TINT-AYD UL20-12 and WD-2018. Other chemical additives for use in the present invention would be apparent to one skilled in the art in view of this disclosure.

The chemical additives have the following functions:
  a. preventing bacterial growth;
  b. improving shelf life stability;
  c. improving wetting of the substrate surface, e.g. porcelain, ceramic and glass surfaces and improving contact with the surface;
  d. aiding in removal of salts from surface formed during contact, e.g. silicate salts;
  e. coloring the composition to allow applicators to determine where they have applied the composition; and
  f. improving coatability of the composition.

The substrate after treatment will have a roughened surface characterized by improved adhesion of a coating such as, paint or epoxies to the substrate. The epoxy composition is preferably prepared in the manner described in U.S. patent application Ser. No. 09/144,411 by Hardy et al., filed Sep. 2, 1998, entitled "COATINGS WITH INCREASED ADHESION", the disclosure of which is incorporated herein by reference in its entirety.

The following examples are detailed description of methods of preparation and use of the composition of the present invention. The detailed preparations fall within the scope of, and serve to exemplify, the more generally described methods set forth above. The examples are presented for illustrative purposes only, and are not intended to limit the scope of the invention.

The invention will now be described by reference to the following non- limiting examples.

EXAMPLE 1

Composition containing mixed bifluoride salts is as follows.

| COMPONENTS | Parts by Weight |
| --- | --- |
| Water | 34.278 |
| Dipropylene Glycol Monoethyl Ether Acetate | 5.896 |
| Propylene Glycol | 2.673 |
| Propylene Glycol phenyl Ether | 0.535 |
| Ammonium Bifluoride | 43.629 |
| Sodium Bifluoride | 10.809 |
| Surfactant | 0.892 |
| KELZAN S Thickener | 0.738 |
| Preservative | 0.442 |
| Toner | 0.018 |
| Total | 100.0 |

EXAMPLE 2

Another formulation of the composition containing ammonium bifluoride is as follows.

| Component | Parts by Weight |
| --- | --- |
| Water | 34.278 |
| Dipropylene Glycol Monoethyl Ether Acetate | 5.896 |
| Propylene Glycol | 2.673 |
| Propylene Glycol Phenyl Ether | 0.535 |
| Ammonium Bifluoride | 54.440 |
| Surfactant | 0.892 |
| KELZAN S Thickener | 0.738 |
| Preservative | 0.442 |
| Toner | 0.018 |
| Total | 100.0 |

EXAMPLE 3

Another formulation of the composition containing sodium bifluoride is as follows.

| Component | Parts by Weight |
| --- | --- |
| Water | 34.278 |
| Dipropylene Glycol Monoethyl Ether Acetate | 5.896 |
| Propylene Glycol | 2.673 |
| Propylene Glycol Phenyl Ether | 0.535 |
| Sodium Bifluoride | 54.440 |
| Surfactant | 0.892 |
| KELZAX S Thickener | 0.738 |
| Preservative | 0.442 |
| Toner | 0.018 |
| Total | 100.0 |

In all of the Examples 1–3 the solid components were the slowly added to the liquids in a high speed mixer and ground until smooth. The composition is then ready for application.

Experimental Results

The following tests were carried out on each of the above Examples 1–3 and variations in the formulation of Example 1. A standard four inch square glazed ceramic tile was used as the substrate. The inventive compositions were applied to the substrate for specified periods of time. A gloss meter was used to measure the degree of gloss where applicable. The tiles were evaluated for (1) etching speed; (2) removal of silica scum; and (3) etching uniformity. The results are shown Table 1–5.

TABLE 1

Etching Speed (minutes)

| Example | 1 | 2 | 3 | 1/no surfactant | 1/no organic solvent |
| --- | --- | --- | --- | --- | --- |
|  | <5 | <10 | <10 | >10 | >5 |

TABLE 2

Removal of Silicate Scum

| Example | 1 | 2 | 3 | 1/no surfactant | 2/no organic solvent |
| --- | --- | --- | --- | --- | --- |
|  | 10 | 10 | 10 | 8–10 | 8–10 |

TABLE 3

Etching Uniformity

| Example | 1 | 2 | 3 | 1/no surfactant | 2/no organic solvent |
|---------|---|---|---|-----------------|----------------------|
| 5 minutes | 8 | 7 | 7 | 5–6 | 5–6 |
| 15 minutes | 9 | 8 | 8 | 6–7 | 5–6 |

The etching speed results in Table 1 were obtained by determining the time required to achieve 80% gloss reduction as measured by a gloss meter. Gloss was measured using a multi-angle gloss meter manufactured by BYK-Gardner under the trade name MICRO-TRI-GLOSS. The results indicate that formulations containing mixed bifluoride salts had the fastest speed, whereas the same formulation having no surfactant had the slowest.

The removal of silicates are shown in Table 2. The tiles were qualitatively evaluated for removal of silicate scum after washing with water and scrubbing with a brush. A score of 10 indicates minimal water and brushing were required; whereas a score less than 10 indicates that it was more difficult to remove silicate scum from the tiles. Results demonstrate that the presence of an organic solvent and surfactant are important for the ease in removing silicate scum that builds up during the etching process.

Table 3 shows results from an etching uniformity test. This test is qualitative with a score of 10 indicating uniform etching. A score less than 10 indicates that etching was not uniform with a score of 0 being the worst in terms of etching uniformity. The results show that etching is most uniform with the use of mixed bifluoride salts in those formulations having both an organic solvent and a surfactant. Etching uniformity was worse in those formulations having no surfactant or no organic solvent present.

Many modifications and variations of the invention will be apparent to those skilled in the art in view of the foregoing disclosure. Therefore, it is to be understood that the invention can be practiced within the scope of the appended claims, otherwise than as specifically disclosed herein.

What is claimed is:

1. A composition for roughening a substrate surface in preparation for refinishing comprising:
   a. ammonium bifluoride in an amount ranging from 40 to 75 parts by weight, and sodium bifluoride in an amount ranging from 10 to 45 parts by weight;
   b. water in an amount ranging from 7 to 75 parts by weight;
   c. organic solvent in an amount ranging from 2 to 20 parts by weight; and
   d. thickener in an amount ranging from 0.1 to 5 parts by weight.

2. The composition of claim 1 wherein the composition has a pH of at least 5.0.

3. The composition of claim 1 further comprising a surfactant in an amount ranging from 0.10 to 2.0 parts by weight.

4. The composition of claim 1 wherein the composition has a viscosity in a range from about 80 to about 100 Krebs units at 25° C.

5. The composition of claim 1 wherein said composition is adapted to roughen a substrate surface containing silicate salts.

6. A method of refinishing substrates comprising the steps of applying to a large surface area of a ceramic tile or porcelain substrate a composition comprising:
   a. ammonium bifluoride in an amount ranging from 40 to 75 parts by weight, and sodium bifluoride in an amount ranging from 10 to 45 parts by weight;
   b. water in an amount ranging from 7 to 75 parts by weight;
   c. organic solvent in an amount ranging from 2 to 20 parts by weight; and
   d. thickener in an amount ranging from 0.1 to 5 parts by weight, and reacting said composition with said substrate surface for a period of time effective to roughen at least a portion of said surface to a degree that enables adherence of a coating on said roughened surface portion.

7. The method of claim 6 wherein said composition has a viscosity in a range from about 80 to about 100 Krebs units at 25° C.

8. The method of claim 6 comprising applying said composition to said substrate surfaces containing silicates.

9. The method of claim 6 comprising brushing said composition onto said substrate surface.

10. The method of claim 6 comprising spraying said composition onto said substrate surface.

11. The method of claim 6 comprising skim-coating said composition onto said substrate surface.

12. The method of claim 6 comprising applying said coating to said roughened surface.

13. The method of claim 6 comprising applying said coating to said roughened surface, wherein said coating comprises:
   a. epoxy resin in an amount ranging from about 25.0 to about 60.0 parts by weight,
   b. acrylic resin in an amount ranging from about 5.0 to about 50.0 parts by weight,
   c. amine in an amount ranging from about 30.0 to about 45.0 parts by weight, wherein the amine is effective to crosslink said epoxy resin, and
   d. silane in an amount ranging from greater than 0 to about 10.0 parts by weight.

14. The method of claim 6 comprising applying said coating to said roughened surface, wherein said coating is a paint and is characterized by adherence to said roughened surface.

15. The method of claim 6 comprising applying the composition to the substrate surface for a time period ranging from about 4 to about 5 minutes.

16. The method of claim 6 wherein said substrate surface is generally vertically oriented.

17. The method of claim 6 further comprising collecting said composition after surface roughening and reusing said composition.

18. The method of claim 6 comprising applying applying said composition to an area having a plurality of substrates.

19. A method for roughening large surface areas in preparation for refinishing comprising the steps of:
   applying a viscous composition comprising:
   a. ammonium bifluoride in an amount ranging from 40 to 75 parts by weight, and sodium bifluoride in an amount ranging from 10 to 45 parts by weight,
   b. water in an amount ranging from 7 to 75 parts by weight;
   c. organic solvent in an amount ranging from 2 to 20 parts by weight; and
   d. thickener in an amount ranging from 0.1 to 5 parts by weight and without acid to a large surface area of substrates selected from the group consisting of ceramic tile substrates and a porcelain substrate;
   reacting said viscous composition with said substrates for a period of time to roughen said substrates so as to remove a substantial portion of a glaze layer from said substrates;

removing said viscous composition from said substrates; and applying a coating to said roughened substrates characterized by adherence of said coating to said roughened substrates.

20. The method of claim 19 further comprising collecting said composition after reacting with said substrates and reusing said composition.

* * * * *

UNITED STATES PATENT AND TRADEMARK OFFICE
CERTIFICATE OF CORRECTION

PATENT NO.     : 6,337,029 B1
DATED          : January 8, 2002
INVENTOR(S)    : Hardy et al.

It is certified that error appears in the above-identified patent and that said Letters Patent is hereby corrected as shown below:

<u>Title page,</u>
The following should be deleted "[73] Assignee: Xim Products, North Olmstead, OH (US)" and the following should be added -- [73] Assignee: XIM Products, Inc., Westlake, OH (US) --

Signed and Sealed this

Fifth Day of November, 2002

*Attest:*

*Attesting Officer*

JAMES E. ROGAN
*Director of the United States Patent and Trademark Office*